Patented Aug. 29, 1950

2,520,619

UNITED STATES PATENT OFFICE 2,520,619

PREPARATION OF TRIETHYLENEMELAMINE

Vernon P. Wystrach, Stamford, and Donald W. Kaiser, Old Greenwich, Conn., assignors to American Cyanamid Company, New York, N. Y., a corporation of Maine No Drawing. Application October 5, 1948, Serial No. 52,978

9 Claims. (Cl. 260—249.6)

The present invention relates to a method of preparing triethylenemelamine.

It is an object of this invention to prepare triethylenemelamine by simple and efficient means, utilizing readily available materials.

It is a further object to prepare triethylenemelamine by reacting cyanuric chloride and ethylenimine in water at low temperatures.

It is a still further object to recover the triethylenemelamine so formed.

The only method of making triethylenemelamine heretofore known in the art has been described by Pingree and Dahlen on page 53 of "Textile Finishing Treatments," P.B.–1576, published by the Office of Technical Sales, Department of Commerce, Washington, D. C. In that method, triethylenemelamine as a hydrogen chloride acceptor and ethylenimine are dissolved in benzene. In a separate container, cyanuric chloride is dissolved in benzene and then is added slowly to the solution of triethylamine and ethylenimine, the temperature being maintained at about 15°–20° C. The addition requires about one hour. The reaction mass is stirred for an additional hour, during which time triethylamine hydrochloride crystallizes out. The slurry is heated to 50°–60° C. and filtered. The filtrate yields two crops of triethylenemelamine crystals: one on cooling, and another on being concentrated. The yield is 70% of theoretical.

The above outlined process is disadvantageous for commercial purposes owing to the inflammability of benzene, the low solubility of triethylenemelamine in benzene, the high cost of the hydrogen chloride acceptor, triethylamine, and the low yield as compared with the near-quantitative yields of the process of this invention.

It is well known that cyanuric chloride reacts with amines at elevated temperatures to replace each of the three chlorines. However, water cannot be used as a solvent to carry out such a reaction owing to the rapid hydrolysis of cyanuric chloride at such temperatures. The use of fairly low temperatures, that is, within the range of —5° to about room temperature, was heretofore thought to be useless in the removal of all three chlorines with amines, since only one chlorine is affected. Previous work in this field has demonstrated that the third chlorine may be substituted by an amine only under high temperature conditions.

Despite all of these indicia as to the futility of using water as a solvent at low temperatures, it has now been found that ethylenimine will react completely with cyanuric chloride in water at low temperatures using inexpensive alkali and alkaline earth bases as hydrogen chloride acceptors. While this invention contemplates the use of temperatures up to room temperature, the yields are small in this upper range, and the lower range of —5° to +10° C. is preferred.

The following examples will illustrate the invention in greater detail, and it is to be understood that the invention is not to be limited thereto but is to be construed broadly and restricted solely by the scope of the appended claims.

Example 1

Cyanuric chloride (which may or may not contain the usual commercial impurities) is dispersed into ice water by stirring in a ratio of 18.8 grams of cyanuric chloride to a mixture of 100 grams ice and 100 grams of water. The slurry may conveniently be prepared directly in a 3-necked flask equipped with an agitator, dropping funnel, and thermometer. The temperature of the flask and contents is maintained within the range of 2–5° C. with an ice-salt mixture. A solution of ethylenimine in an aqueous solution of potassium carbonate prepared in the proportions of 14 grams ethylenimine, 44.5 grams potassium carbonate, and 150 grams of water, is added dropwise to the cyanuric chloride slurry. The reaction solution is then clarified with a little activated charcoal, filtered, and extracted with chloroform. Despite the fact that triethylenemelamine is more soluble in water than in chloroform, in a two-phase system (water-chloroform) nearly 75% of the triethylenemelamine is distributed in the chloroform, and hence a few extractions with that solvent suffice to separate the material from the original reaction medium. Five extractions with 50 ml. portions of chloroform gave 19 grams of product, and an additional 3 extractions with 25 ml. portions gave 0.5 gram, a total yield of 95.7%. The product obtained by evaporating such an extract is a white microcrystalline powder.

If desired, the slurry of cyanuric chloride may be prepared by dissolving cyanuric chloride in one of the well known solvents for cyanuric chloride in one of the well known solvents for cyanuric chloride such as dioxane or the like, and then pouring this solution into ice water. A slurry of finely divided cyanuric chloride results.

Bases such as alkali carbonates and hydroxides may be used as hydrogen chloride acceptors. However, potassium carbonate gave the best results and is the preferred hydrogen chloride acceptor. It is best used in the ratio of about one mole potassium carbonate to one mole hydrogen chloride eliminated, or three moles potassium carbonate to one mole cyanuric chloride. Reducing the base: HCl ratio tends to reduce the yield and to cause foaming due to the liberation of carbon dioxide from the generated potassium bicarbonate.

*Example 2*

To 150 cc. of water was added 44.5 grams of potassium carbonate and 14 grams of ethylenimine. The resulting solution was added dropwise into a slurry made by dissolving 18.4 grams of cyanuric chloride in 50 cc. of dioxane, and adding the solution so made to 150 grams of ice in 200 cc. of water. The dropwise addition required 40 minutes, during which time the temperature of the reaction medium was maintained at 3°–5° C. Multiple extraction with chloroform gave 19 grams of triethylenemelamine, a yield of 94.2%.

*Example 3*

A run was made similar to that of Example 2 except that 100 grams of ice and 100 cc. of water were used as the slurry suspension medium for the cyanuric chloride. A 98% yield was obtained.

*Example 4*

A solution consisting of 14 grams of ethylenimine, 13 grams of sodium hydroxide, and 100 cc. of water was added to a slurry made by dissolving 18.4 grams of cyanuric chloride in 35 cc. of dioxane, and then adding the cyanuric chloride solution into a mixture of 100 grams of ice and 100 cc. of water. The ethylenimine solution was added to the cyanuric chlorine slurry over a 40-minute period, the temperature being maintained at 2°–4° C. Extraction with chloroform yielded 12.7 grams of triethylenemelamine, or 62.3% of the theoretical.

*Example 5*

18.8 grams of cyanuric chloride was added directly to a mixture of 50 grams of ice in 150 cc. of water with stirring. To this slurry was added over a period of 22 minutes a solution of 17 grams of sodium carbonate and 14 grams of ethylenimine in 150 cc. of water, the temperature of the reaction vessel being maintained at 2°–3° C. Extraction with chloroform gave 20 grams of triethylenemelamine, a 98% yield.

*Example 6*

9.3 grams of calcium carbonate was slurried with 5.64 grams of cyanuric chloride in 65 cc. of water with stirring. To this slurry was added over a period of 42 minutes a solution of 4 grams of ethylenimine in 40 cc. of water, the temperature of the reaction vessel being maintained within the range of 2°–5° C. Extraction with chloroform gave 2.1 grams of triethylenemelamine, a yield of 32.9%.

*Example 7*

A solution of 44.5 grams of potassium carbonate in 250 cc. of water was prepared, to which was added 18.8 grams of cyanuric chloride with sufficient agitation to form a finely divided slurry. To this slurry was added 14 grams of ethylenimine over a period of 13 minutes, the slurry being maintained at a temperature ranging from −5° to +7° C. Multiple extraction with chloroform gave 17.8 grams of triethylenemelamine, a yield of 88.5%.

*Example 8*

A solution of 222 grams of potassium carbonate in 1250 cc. of water was prepared, and to this was added 94 grams of cyanuric chloride with stirring so that a slurry was formed. To this slurry 67.5 grams of ethylenimine was added over a period of 54 minutes, the temperature of the slurry being maintained at −3° to +3° C. Multiple extraction with chloroform gave 93.7 grams of triethylenemelamine, a yield of 91.9%.

*Example 9*

A solution of 34 grams of sodium carbonate in 250 cc. of water was prepared, and to this was added 18.8 grams of cyanuric chloride with stirring so that a slurry was formed. To this slurry 14 grams of ethylenimine was added dropwise, the temperature of the slurry being maintained within the range of −5° to +10° C. Multiple extraction with chloroform gave 17.5 grams of triethylenemelamine, a yield of 87.3%.

In conducting the reaction, it is preferred that the reaction mass be constantly agitated. Generally, after ¼ to ⅓ of the ethylenimine is added the solution becomes quite thick and good agitation is necessary to keep the mass moving without resorting to dilution. Thereafter, the slurry gradually thins until solution is attained.

Although triethylenemelamine may be recovered by numerous means, such as fractional crystallization and other means well known in the art, it is preferred that the material be recovered by chloroform extraction since it has been found that commercial cyanuric chloride contains a contaminant possessing a deep yellow color, possibly iron, which contaminant remains in the aqueous phase upon chloroform extraction. Chloroform is also advantageous in that it does not remove cyanuric chloride hydrolysis products from the alkaline solution.

While the invention has been described with particular reference to specific embodiments, it is to be understood that it is not to be limited thereto but is to be construed broadly and restricted solely by the scope of the appended claims.

We claim:

1. The method comprising admixing water, cyanuric chloride, ethylenimine, and a hydrogen chloride acceptor of the group consisting of alkali metal hydroxides, alkali metal carbonates, alkaline earth hydroxides, and alkaline earth carbonates, at a temperature below 20° C. whereby hydrogen chloride and triethylenemelamine are formed, and recovering the latter.

2. The method according to claim 1 in which triethylenemelamine is recovered by extracting the reaction admixture with chloroform at least once.

3. The method according to claim 1 in which the mole ratio of hydrogen chloride acceptor to the hydrogen chloride formed is greater than one.

4. The method according to claim 1 in which the mole ratio of cyanuric chloride to ethylenimine is about 1:3.

5. The method according to claim 1 in which the admixture of materials is maintained within the temperature range of −5° to +5° C.

6. The method according to claim 1 in which an aqueous solution of ethylenimine is added to cyanuric chloride suspended in an aqueous solution of the hydrogen chloride acceptor.

7. The method according to claim 1 in which an aqueous solution of ethylenimine and the hydrogen chloride acceptor is added to an aqueous dispersion of cyanuric chloride.

8. The method according to claim 1 in which a dispersion of cyanuric chloride in an aqueous solution of the hydrogen chloride acceptor is added to an aqueous solution of ethylenimine.

9. The method according to claim 1 in which an aqueous slurry of cyanuric chloride is added to ethylenimine dissolved in a solution of the hydrogen chloride acceptor.

VERNON P. WYSTRACH.
DONALD W. KAISER.

REFERENCES CITED

The following references are of record in the file of this patent:

UNITED STATES PATENTS

| Number | Name | Date |
| --- | --- | --- |
| 2,272,489 | Ulrich | Feb. 10, 1942 |
| 2,298,533 | Heintrich | Oct. 13, 1942 |
| 2,306,439 | Heintrich | Dec. 29, 1942 |
| 2,394,306 | Heintrich | Feb. 5, 1946 |
| 2,475,068 | Wilson | July 5, 1949 |

OTHER REFERENCES

PB 1576, Appendix XII, p. 2.
Berichte, vol. 28, p. 2933.

Certificate of Correction

Patent No. 2,520,619                                                             August 29, 1950

VERNON P. WYSTRACH ET AL.

It is hereby certified that error appears in the printed specification of the above numbered patent requiring correction as follows:

Column 2, line 24, for "2–5° C." read *2–4° C.*; column 3, line 37, for the word "chlorine" read *chloride*;

and that the said Letters Patent should be read as corrected above, so that the same may conform to the record of the case in the Patent Office.

Signed and sealed this 21st day of November, A. D. 1950.

[SEAL]

THOMAS F. MURPHY,
                                                                           *Assistant Commissioner of Patents.*